Sept. 10, 1940. W. A. RING ET AL 2,214,724
CONTAINER AND RELEASE MECHANISM FOR AIRCRAFT
Filed Feb. 3, 1939 2 Sheets-Sheet 1
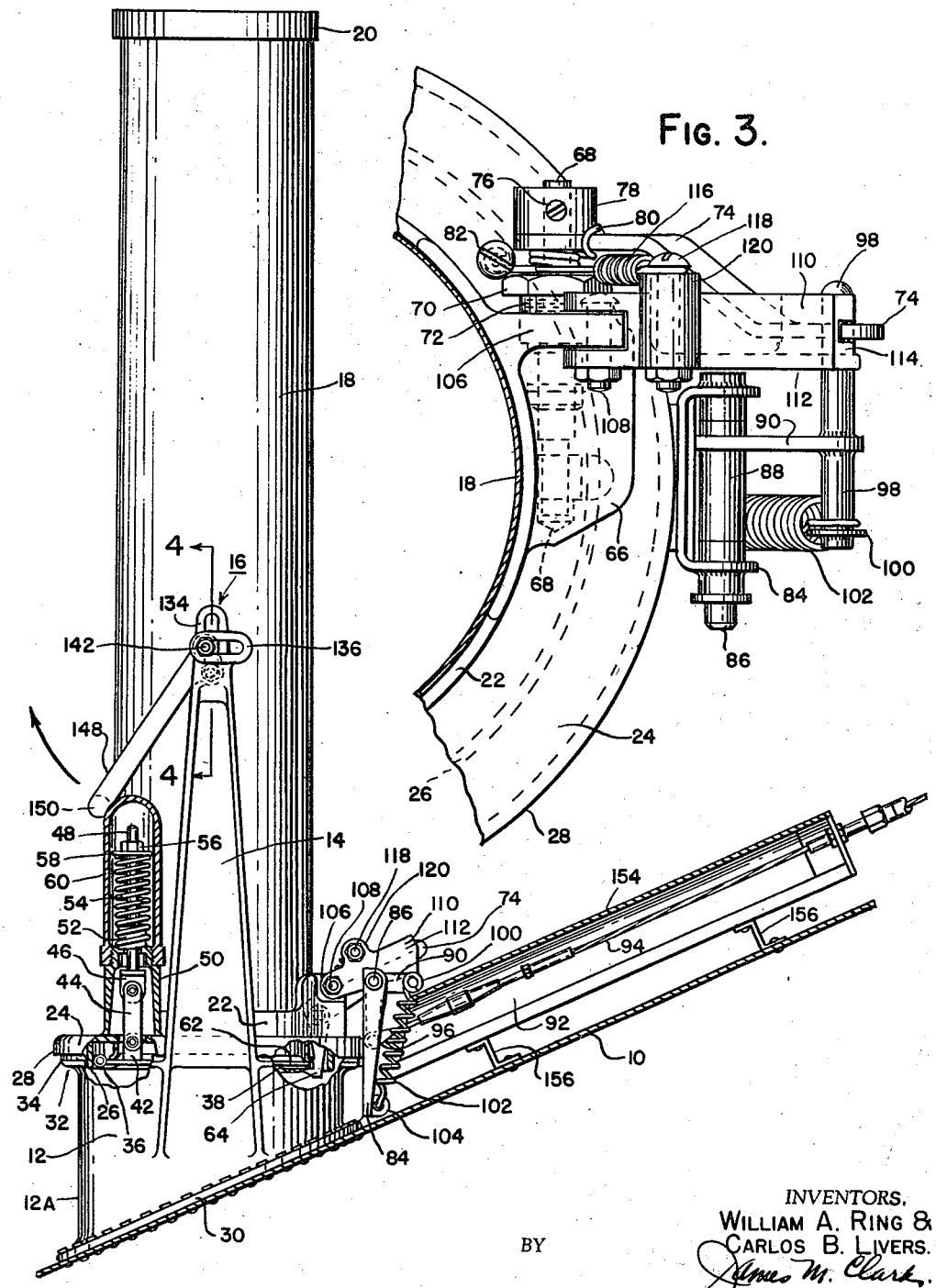
INVENTORS.
WILLIAM A. RING &
CARLOS B. LIVERS.
BY
ATTORNEY.

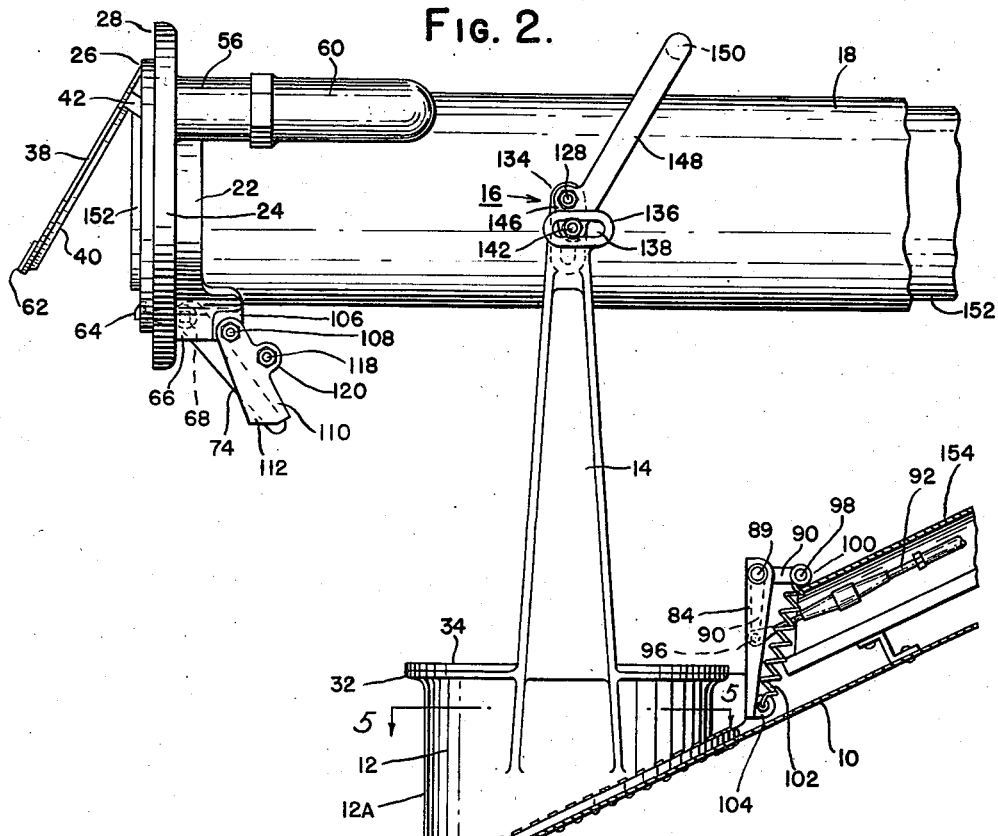
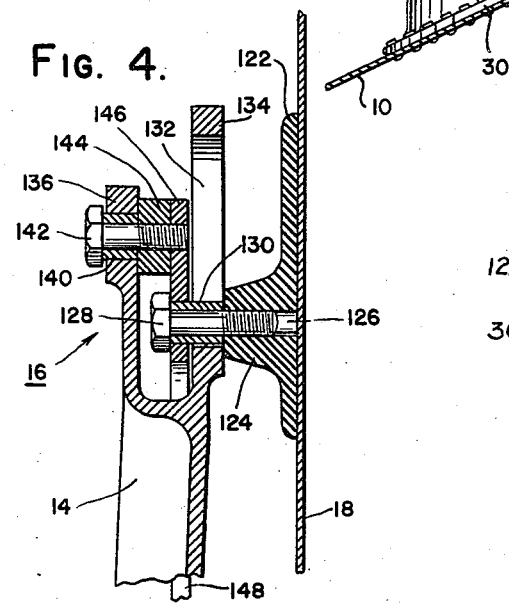
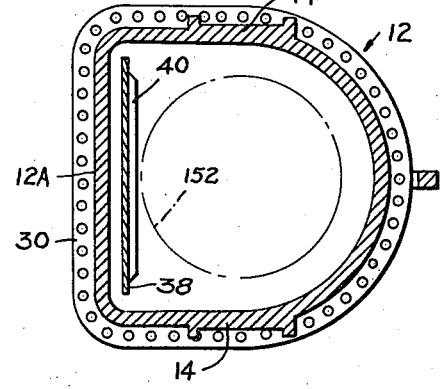
INVENTORS.
WILLIAM A. RING &
CARLOS B. LIVERS.
ATTORNEY.

Patented Sept. 10, 1940

2,214,724

UNITED STATES PATENT OFFICE 2,214,724

CONTAINER AND RELEASE MECHANISM FOR AIRCRAFT

William A. Ring and Carlos B. Livers, San Diego, Calif., assignors to Consolidated Aircraft Corporation, a corporation of Delaware Application February 3, 1938, Serial No. 188,405

14 Claims. (Cl. 89—1)

The present invention relates to the releasing of articles from aircraft such as emergency landing flares, messages, bombs or the like and is particularly directed to a container for such articles and to release mechanism for accomplishing the discharge thereof.

An object of this invention is to provide a container adapted to sustain an article such as a parachute flare, which it is desired to later release, and of mechanism by which such release can be readily accomplished. A principal object is provision of a permanently mounted structure in the skin of an aircraft fuselage, on which the said container is supported and by means of which the attitude thereof may be readily altered to permit of accessible loading or by which it may be locked in the loaded position in readiness for discharge. An additional object is to provide a device as described which due to its particular construction shall require a minimum of overhead clearance and is thus adapted for location in portions of an aircraft fuselage or wing of restricted depth whereby the more valuable portions of the fuselage interior may be reserved for other uses.

A further object is the provision of means whereby when the flare container is locked in operating position a perfectly water-tight seal is provided between the interior and exterior of the aircraft skin regardless of whether the container is loaded or not. Another object is to provide a container which is itself water-tight and which can be loaded and discharged an indefinite number of times during flight and which is of such simple and sturdy construction as to forestall the possibility of broken parts or general inoperability during normal service.

With these and other purposes in view the preferred embodiment of this invention is described and shown in connection with the following figures of which Fig. 1 is a side elevation showing the container in operating position as well as in its relation to the operating mechanism and to the aircraft skin;

Fig. 2 is a side elevation similar to Figure 1 showing the container unlocked and pivoted to the position of loading;

Fig. 3 shows in plan the release mechanism and safety device;

Fig. 4 illustrates in cross section the detail of the pivotal container mounting and its associated locking lever, and Fig. 5 is a cross-sectional view taken on the line 5—5 of Figure 2.

It is to be understood that the practical embodiment disclosed in the drawings admits of various changes or modifications and that such variations are not to be limited thereby but solely by the scope of the appended claims and though the invention has been described principally as being useful for the discharge of landing flares it is equally adapted for discharging float lights, depth bombs, ammunition, supplies, messages and so on, and hence this application is intended to cover such additional uses.

Referring now to the drawings and particularly to Figs. 1 and 2, a portion of an aircraft skin is shown at 10 which in this instance is intended to be a transverse cross-section of the aft portion of a V-bottom watertight hull. Riveted to this skin 10 in superimposed relation to a hole therethrough, is a base member 12 carrying a pair of diametrically disposed arms 14 which taper upwardly to terminate in a forked conformation or trunnion generally indicated at 16. Pivoted to this structure by a mounting, which will later be described, is a cylindrical flare container 18 which is surmounted at its upper end by a watertight cap 20. At the opposite extremity thereof is borne a collar 22 which is attached in a watertight engagement of any suitable type, as by screw threads, and which below the end of the cylinder 18 flares outwardly in a flange portion 24. This flange is shown in greater detail in Fig. 3 and as constructed it has depending therefrom two concentric circular skirts 26 and 28 and of these, the former may be considered a continuation of the collar 22 but of somewhat larger diameter so as to leave an annular space between the outer wall of container 18 and the inner wall of skirt 26. Also it is of slightly greater length than the outer skirt 28. The object of this arrangement will become obvious during the further course of this specification.

The base member 12 is of a generally cylindrical shape having a flat portion 12A in a vertical plane along its longest side with integral flanges 30 and 32 on its opposite ends. The lower flange 30 serves as the means whereby the base is riveted to the skin 10 and is suitably truncated or formed so that its plane makes an angle with the longitudinal axis of the base 12 which will conform to the angle which the hull bottom 10 makes to the vertical. In the present instance the hull covering 10 slopes upwardly away from the direction of flight and outwardly from the keel. With regard to the flange 32 it is pointed out that its plane is perpendicular to the said axis and its purpose is to provide a seat upon which is placed a circular gasket 34 so that when the container 18 is locked in the position of Fig. 1 the aforementioned flange 24 and the two skirts 26 and 28 will seat upon and partially surround the flange 32 to provide a watertight seal. In other words, water entering through the discharge hole in the skin 10 could pass up the interior of base 12 but could not find entry to the aircraft interior through the joint between flanges 24 and 32 or gasket 34.

Fastened interiorly of the skirt 26 and adjacent the flat side 12A of the base 12 is a hinge 36 upon which is supported a circular door 38 which has a raised center portion 40 having beveled edges adapted to fit into and tightly contact the slightly flared and open lower end of container 18. By its construction the door 38 is thus adapted to render the only opening in container 18 watertight so that the interior thereof as well as its contents are kept perfectly dry even though the aircraft may be floating on water with the exterior of said door exposed to its pressure. This door 38 has an upstanding arm 42 to which is pivoted a link member 44 in turn pivoted to an eared portion 46 of a plunger rod 48. When in assembled relation the arm 42 and the link 44 extend through the flange 24 into a cylindrical member 50 cast integrally therewith and surmounted by two similar cylindrical portions which are also integral but of progressively smaller diameter. The first of these has screw threads cut into its outer surface while the second, which has been indicated by the numeral 52, has an axial bore through which the rod 48 extends to thereafter be encircled by a coil spring 54 which is held under adjustable compression by a nut 56 on rod 48 together with a washer 58. Thus the door 38 may be opened by pressure sufficient to overcome spring 54 and in doing so will pivot on hinge 36 down into the hollow interior of base 12 which is designed with the flat side 12A which provides sufficient clearance to allow such action. However, when such pressure is relieved the spring action will immediately swing the door shut making the container again watertight. To enclose the spring mechanism and prevent the leakage of the water which passes through the bore of cylindrical portion 52 there is provided a domed cap 60 which screws onto the threaded portion of the cylindrical base 50.

Diametrically opposite the hinge 36, the door is provided with a locking plate 62 which is suitably fastened thereon and which is normally engaged by a snap latch or hook 64 serving to hold the said door closed. The head of the hook 64 is suitably beveled so that when the spring 54 swings the door 38 closed, the plate 62 will strike thereagainst to force the hook 64 backward in pivotal movement within the annular space between the skirts 26 and 28, until the door is fully closed at which time the hook is returned by spring action and engages the plate 62.

Also diametrically opposite the hinge 36 is a hollow extension 66 on the collar 22 (see Fig. 3) which provides an enclosed chamber for a short shaft 68 journalled therein and upon which is squared the previously mentioned hook 64. This shaft 68 extends through one wall of the chamber 66, as shown, and at the point of its emergence there is provided a surrounding nut 70 and packing rings 72 which prevent any water leakage at this point. The external portion of shaft 68 carries a lever 74 which is fixed thereto by means of a set screw 76 positioned in the lever hub 78 and between this hub and the nut 70 is located a coil spring 80 which encircles the shaft 68 so that one end embraces lever 74 while the other is tied down to the flange 24 by means of a headed screw 82. By this means the hook 74 is at all times urged to its normal locking position.

Attached to the edge of the flange 32 is a channelled support wedge 84 which at its upper and wider section journals between its side flanges a shaft 86 supporting a loosely mounted sleeve 88 which serves as the pivotal hub of a bell crank 90. Through suitable connectors 92 a pull cable 94 is pivotally joined at 96 to one arm of bell crank 90 while permanently connected at the extremity of the other arm thereof is a rod 98 which at one end has a fixed washer 100 designed to retain a terminal loop of a coil spring 102 which oppositely attaches to the ear 104 at the bottom of channel member 84. This spring 102, by its tension, functions to pull the rod 98 in a clockwise direction and thus maintain the cable 94 taut and in its neutral unoperative position.

As previously stated a lever 14 extends from the shaft 68, and this lever by traversing a double bend reaches to and overlies the end of rod 98 opposite the washer 100. Moreover the hollow extension 66 has an upstanding lug 106 which is pierced by a hole through which a bolt 108 extends and upon which is pivotally mounted a flat lever 110 which has a depending side portion 112 and an end portion 114 which overlies and partially surrounds the extremity of lever 74 and which through a coil spring 116, bolt 118 and lug 120 is pressed into contact engagement therewith and thus in turn the lever 74 is forced to contact rod 98 by it as well as by spring 80. The purpose of the lever 110 is to serve as a guard and locking device preventing the accidental movement of lever 74. This completes the detail of the locking and release mechanism of the flare container with the exception of the operating pull handle attached to the far end of table 94 but as it is of conventional construction and is not a part of this invention, it will not be given further attention.

Referring generally to Figs. 1 and 2 and in particular to Fig. 4, the details of the pivotal suspension of container 18 on the spaced arms 14 will now be considered. To begin with, at diametrically opposite points on the surface of container 18 are fixed similarly curved plates 122 each of which extends as a boss 124 having a radially extending, screw-threaded bore 126. Fitted into bore 126 is a bolt 128 which is surrounded by a loosely fitting sleeve 130 organized to reciprocate in a vertical slot 132 formed in the inner arm 134 of fork 16. The outer arm 136 is disposed so that its corresponding slot 138 extends horizontally rather than vertically and contains a similar sleeve 140 loosely mounted on bolt 142 which extends through a spacing collar 144 to a screw threaded engagement with a link 146 which loosely connects to the bolt 128 by surrounding the sleeve 130. Thus the two bolts 128 and 142 are joined by the rigid link 146. An important feature of this link is the fact that it has an integral extension 148 and, remembering that the organization of parts just described is provided in duplicate, that is one for support of each side of the container 18, and as these extensions 148 are joined through the agency of a common hand grip 150 it becomes apparent that any movement of one will coexist in the other. Further it is important to note that due to the horizontal and vertical attitudes of the slots 138 and 132 respectively, the bolts 142 and 128 positioned therein can only reciprocate on horizontal and vertical paths, respectively, and that therefore if the handle 150 is swung upward in the direction of the arrow Fig. 1 the first part of the ensuing action is pivoted on bolt 128 with bolt 142 sliding horizontally in slot 138 but, when the link 146 completes its limited throw in the same direction as bolt 142, then the pivoting action is continued on bolt 128 with bolt 128 now sliding vertically in slot 132.

Thus it is seen that the action so far resulting from an upward swing of handle 150 may be divided into two distinct phases, the first being an unlocking action while the second is a raising action which lifts the bosses 124 vertically and which naturally is accompanied by a vertical lifting of the entire container 18 so that it will separate from the base 12 along the line of the gasket 34. Incidentally, this movement will not effect the release mechanism except that the lever 74 will be lifted from its contact with rod 98 but no other relative change will be caused thereby. When the bolt 128 has reached the upward limit of its travel as defined by slot 132, the handle 150 may travel still more, upon which the toggle action enters a third phase; another locking action by which the container is locked in its raised position. In this phase the pivoting action is transferred again to bolt 128 with bolt 142 retracing its previous horizontal path to the end of the slot. As an alternative construction it may prove desirable to so limit the length of slot 132 that when the link 146 reaches the point of its throw where the axes of bolts 128 and 142 intersect the vertical line of symmetry of slot 132 it will be on what might be termed its dead center and will be compressed between the bolts 128 and 142. It will take considerable force to move the handle 150 up to and past this point for that reason, so that if the handle is forced until the bolt 142 reaches the end of slot 138 then the compression will be relieved and the handle will be in a locked attitude. However, in either case in this terminal position the container 18 may be pivoted to a horizontal position, the door 38 opened, and a flare 152 or other article slipped inside; the spring 54 will then close the same, following which pivoting of the container 18 to the vertical, and a reverse pull on handle 150 will cause a reverse sequence of toggling actions as described above and of which the third phase will consist in a locking of the container 18 to the base 12.

To discharge the container the operator grasps the handle in the forward part of the aircraft and his pull is transmitted by cable 94 to bell crank 90 which is thus pivoted in a counterclockwise direction to force the lever 74 upwardly turning shaft 68 and thereby moving the latch 64. The weight of the flare 152 then forces the door 38 open, it slides out and then the door closes as described. To prevent fouling of cable 94 with consequent discharge of the flare, a tubular guard or shield 154 is positioned to surround the cable and is supported on angle legs 156.

Having thus fully described the invention, what we desire to claim as new is:

1. In an article discharging device for aircraft, a hollow base member, pivot arms carried thereby, a container pivotally supported by said arms at a point spaced from said base, a door hinged to said container, release mechanism for said door, mechanism for locking said container to said base in a watertight relationship comprising a toggle lock constituting a part of the pivotal support of said container, and actuating means for said toggle lock adapted to allow rotation of said container about its pivotal mounting when in its unlocked attitude.

2. In an article discharging device for aircraft, a base member, elongated support arms carried thereby, a container supported by said arms in a normally aligned relation to said base, a door closing the open end of the container, said base being formed to receive the door end of said container in watertight relationship and to provide for the operation of said door therein, and mechanism for releasing said container from engagement with said base for pivotal movement with respect thereto comprising a pivoted lever organized to first move said container away from said base along the line of their coincident axes and thereafter to allow pivotation of said container with respect to said support arms.

3. In an article discharging device for aircraft a base member, elongated trunnion arms carried thereby, a watertight container supported by said arms at a point spaced from said base, a watertight door closing the otherwise open end of the container, said base being formed to receive the door-end of said container in watertight relationship and to provide for the operation of said door therein, and mechanism for releasing said container from said base for pivotal movement about an axis intersecting the axis of said base member.

4. In an article discharging device for aircraft, a base member, elongated support arms carried thereby, a container pivotally supported by said arms at a point remote from said base for rotation about an axis transverse with respect thereto, a watertight door in said container, a latch for retaining said door in closed attitude, a spring actuated device for closing said door, mechanism for locking said container to said base comprising a hand lever operating upon the pivot support of said container to cause locking thereof to said base member in axial alignment therewith and release mechanism mounted on said base member for operating said latch only when the container is locked to the base member.

5. In an article discharging device for aircraft, a base member, bifurcated support means carried thereby, a container pivotally supported by said means to be adapted for rotation with respect thereto, a watertight door in said container, a latch for retaining said door in locked relationship, release mechanism for operating said latch means tending to close said door, a manual device organized to lock said container to said base in watertight relationship upon one movement thereof whereby said container is prevented from rotation and to separate the container from the base upon reverse movement thereof, whereupon said release mechanism is rendered incapable of affecting said latch.

6. In an article discharging device for aircraft, a hollow base member, trunnion arms carried on opposite sides of said base member, a container pivotally supported between said arms for rotation to a transverse position with respect thereto, a watertight door associated with said container, means for retaining said door in locked relationship, release mechanism for operating said means, an adjustable tension device for closing said door and a hand lever organized to allow rotation of said container into position from which it can be locked to said hollow base with said door in axial alignment therewith upon movement of said hand lever.

7. In an article discharging device for aircraft, a base member, trunnion arms disposed on opposite sides of said base member, a watertight container pivotally supported between said arms, a watertight door in said container, a latch for retaining said door in locked relationship, release mechanism for operating said latch, an adjustable tension device for closing said door, a lever organized to compress said container against said base in watertight relationship, the said hand lever being adapted to lock itself in either of its extreme positions, and a flange member carried by said container adapted to segregate in a watertight housing said door, latch and tension device when said container is locked to said base.

8. In combination in an article discharging device, a hollow base member, trunnion arms extending therefrom, a container pivotally supported by said arms for rotation about a transverse axis, lever mechanism for locking said container to said base in axial alignment therewith, remotely controlled mechanism for discharging said container comprising cooperating lever assemblies, one lever assembly being attached to said container, the other lever assembly being fixedly mounted on said base, the said lever assemblies being so organized as to engage each other only when said container is rotated into axial alignment with said base and transmission means linking the second said lever assembly with its remote control.

9. In an article discharging device for aircraft, a base member, support means extending therefrom, a container pivotally supported by said means, a water-tight door in said container, a latch for retaining said door in locked relationship, remotely controlled release mechanism for operating said latch comprising cooperating linkage assemblies separable upon pivotal movement of said container, an actuating cable in operable engagement with one of said linkage assemblies, an enclosing shield for said cable, a spring actuated device for closing said door, a hand lever organized to lock said container to said base and structure carried by said container adapted to cooperate with said base to form a watertight shield segregating said door, latch and spring device from the interior of said aircraft upon the locking of said container to said base.

10. In an article discharging device for aircraft the combination of a container equipped with a door, a fixed cylindrical base formed with trunnion arms for the pivotal support of said container, release mechanism for said door comprising separable lever assemblies and remote control means connected to operate one of said assemblies, said assemblies being carried respectively by said container and by said base and being so organized that operation of the one can operate the other to release said door only when said container is axially aligned with said base.

11. In an article discharging device for aircraft the combination of a container equipped with a door and pivotally mounted with respect to a fixed base, release mechanism for said door comprising a shaft carried by said container, a latch mounted on said shaft engageable with said door, spring means urging such engagement, a lever extending from said shaft, a contact member, said contact member being engaged by said lever when said container is aligned with said base, a bell-crank sustaining said contact member, a pivotal mounting for said bell-crank on a fixed portion of said aircraft and remote control means connected to actuate said bell-crank.

12. In an article discharging device for aircraft the combination of a container equipped with a door and pivotally mounted with respect to a fixed base, a pair of support members extending from said base to terminate in bifurcated ends formed so that each of said bifurcations contains a slot, the similarly disposed slots of each support member constituting a pair being disposed at right angles to the slots constituting the remaining pair, a U-shaped lever pivotally mounted by projections of its ends engaging in one set of corresponding slots and projecting spindles oppositely attached to said container adapted each to extend through one of the slots of the other set to engage apertures spaced from the said projections in the ends of said U-shaped lever.

13. In an article discharging device for aircraft, a hollow base member, pivot arms carried thereby, a container pivotally supported by said arms at a point spaced from said base, a door hinged to said container, release mechanism for said door, mechanism for locking said container to said base in a watertight relationship comprising a toggle lock constituting a part of the pivotal support of said container, actuating means for said toggle lock, the said toggle lock being adapted to allow rotation of said container about its pivotal mounting and structure carried by said container adapted to cooperate with said base to form a watertight shield segregating said door and release mechanism from the interior of said aircraft upon the locking of said container to said hollow base member.

14. In an article discharging device for aircraft, a hollow base member, pivot arms carried thereby terminating in bifurcated ends formed so that each of said bifurcations contains a slot, the similarly disposed slots of each support member constituting a pair being disposed at right angles to the slots constituting the remaining pair, a substantially U-shaped lever pivotally mounted by projections of its ends engaging in one set of corresponding slots, an article container and spindles projecting from opposed points on said container adapted each to extend through one of the slots of the other set to engage apertures spaced from said projections in the ends of said U-shaped lever, the said U-shaped lever being organized to cause locking of the said container in axial alignment with said base in one terminal position or transversely thereto in its other terminal position.

WILLIAM A. RING.
CARLOS B. LIVERS.